United States Patent [19]

Glaeser

[11] Patent Number: 5,372,298
[45] Date of Patent: Dec. 13, 1994

[54] TRANSIENT LIQUID PHASE CERAMIC BONDING

[75] Inventor: Andreas M. Glaeser, Berkeley, Calif.

[73] Assignee: The Regents of the University of California, Oakland, Calif.

[21] Appl. No.: 105,049

[22] Filed: Aug. 10, 1993

Related U.S. Application Data

[63] Continuation-in-part of Ser. No. 817,540, Jan. 7, 1992, Pat. No. 5,234,152.

[51] Int. Cl.$^5$ .............................................. B23K 31/02
[52] U.S. Cl. .................. 228/195; 228/122.1; 228/124.1; 228/121
[58] Field of Search ................ 228/121, 122.1, 124.1, 228/124.5, 124.6, 195

[56] References Cited

U.S. PATENT DOCUMENTS

| | | | |
|---|---|---|---|
| 3,504,426 | 4/1970 | Craig et al. | 228/122.1 |
| 3,981,429 | 9/1976 | Parker | 228/195 |
| 4,038,041 | 7/1977 | Duvall et al. | 228/195 |
| 4,208,222 | 6/1980 | Barlow et al. | 228/195 |
| 4,273,282 | 6/1981 | Norvell et al. | 228/205 |
| 4,562,121 | 12/1985 | Thiemann et al. | 228/124.5 |
| 4,598,025 | 7/1986 | Mizuhara | 228/122.1 |
| 4,601,423 | 7/1986 | Pipkin et al. | 228/124.1 |
| 4,602,731 | 7/1986 | Dockus | 228/121 |
| 4,629,662 | 12/1986 | Brownlow et al. | 428/432 |
| 4,746,054 | 5/1988 | Moats et al. | 228/124.1 |
| 4,746,055 | 5/1988 | Ingram et al. | 228/56.3 |
| 4,749,118 | 6/1988 | Yokoi et al. | 228/262.21 |
| 4,797,328 | 1/1989 | Boehm et al. | 228/121 |
| 4,798,320 | 1/1989 | Fang | 228/124.7 |
| 4,859,531 | 8/1989 | Tsuji et al. | 228/121 |
| 4,897,311 | 1/1990 | Oda et al. | 428/433 |
| 4,901,904 | 2/1990 | Tsuno | 228/121 |
| 4,946,090 | 8/1990 | Hepburn | 228/121 |
| 5,002,218 | 3/1991 | Ueoka et al. | 228/121 |
| 5,082,161 | 1/1992 | Utida et al. | 228/122 |

OTHER PUBLICATIONS

"Partial Transient Liquid Phase Metals Layer Technique of Ceramic Metal Bonding," Y. Lino, *Journal of Materials Science Letters*, vol. 10, No. 2, pp. 104–107, Jan. 1991.

"TLP Bonding: A New Method for Joining Heat Resistant Alloys," Duvall et al., *Welding Journal*, vol. 53, No. 4, pp. 203–214, Apr. 1974.

"Direct Brazing of Ceramics for Advanced Heavy-Duty Diesels," Moorhead et al., *Welding Journal*, vol. 65, No. 10, pp. 17–31, Oct. 1986.

*Primary Examiner*—Samuel M. Heinrich
*Attorney, Agent, or Firm*—Heller, Ehrman, White & McAuliffe

[57] ABSTRACT

Ceramics are joined to themselves or to metals using a transient liquid phase method employing three layers, one of which is a refractory metal, ceramic or alloy. The refractory layer is placed between two metal layers, each of which has a lower melting point than the refractory layer. The three layers are pressed between the two articles to be bonded to form an assembly. The assembly is heated to a bonding temperature at which the refractory layer remains solid, but the two metal layers melt to form a liquid. The refractory layer reacts with the surrounding liquid and a single solid bonding layer is eventually formed. The layers may be designed to react completely with each other and form refractory intermetallic bonding layers. Impurities incorporated into the refractory metal may react with the metal layers to form refractory compounds. Another method for joining ceramic articles employs a ceramic interlayer sandwiched between two metal layers. In alternative embodiments, the metal layers may include sublayers. A method is also provided for joining two ceramic articles using a single interlayer. An alternate bonding method provides a refractory-metal oxide interlayer placed adjacent to a strong oxide former. Aluminum or aluminum alloys are joined together using metal interlayers.

31 Claims, 6 Drawing Sheets

TRANSIENT LIQUID PHASE CERAMIC BONDING

CROSS-REFERENCE TO RELATED APPLICATION

The present application is a continuation in part of copending application Ser. No. 07/817,540 filed on Jan. 7, 1992, now U.S. Pat. No. 5,234,152.

BACKGROUND OF THE INVENTION

The present invention is directed generally to bonding ceramic articles. It is directed in particular to a method for isothermally bonding ceramic materials and refractory metals.

Ceramics have low specific gravities and high flexure and tensile strengths. They therefore have potential applications in heat engines and heat exchangers, as well as microelectronics and a variety of other technologies. There is thus a need for reliable and efficient methods of bonding ceramics to ceramics. Particularly, for engine applications, the bond between the two ceramic articles must be able to withstand high amounts of stress and high temperatures. Bonding a ceramic to a ceramic or a ceramic to a metal is frequently accomplished using a metal interlayer between the materials to be bonded. Well-known bonding methods include solid-state bonding and brazing.

Brazing involves holding articles to be bonded in contact with a metal interlayer to form an assembly. The assembly is heated to a temperature sufficient to melt the interlayer. The interlayer preferably includes an alloy which forms a reactive liquid phase for wetting the articles to be bonded. After the interlayer has been melted, the assembly may be cooled to solidify the interlayer and form a bond.

Materials used to form a brazing interlayer include pure aluminum (Al) and Al alloys, silver-titanium (Ag-Ti) alloys, silver-copper-titanium (Ag-Cu-Ti) alloys, silver-copper-indium-titanium alloys (Ag-Cu-In-Ti) alloys, silver-copper-tin-titanium alloys (Ag-Cu-Sn-Ti) alloys and copper-nickel-titanium (Cu-Ni-Ti) alloys. Although more refractory brazing alloys exist, the most commonly used brazing alloys have brazing temperatures below about 1000° C. As such, assemblies joined by such brazing alloys are unlikely to be suitable for high temperature applications. Further, even for low temperature applications, the expansion coefficient of a brazing interlayer and a ceramic may be sufficiently different that significant thermal stresses may result when an assembly is heated or cooled. The thermal stresses may result in immediate fracture of the assembly, or ultimate failure if the assembly is subjected to thermal cycling.

Ceramics are preferably bonded using an interlayer including a refractory metal. Refractory metals are preferred not only because of their high melting point, but because they include metals which have the closest expansion coefficient match with ceramics. A reasonably good expansion match is important in reducing thermal stresses when a bond is cooled from its bonding temperature, or when a bond is to be used in thermal cycling conditions.

Solid-state bonding may be used when bonding ceramic materials using such a refractory metal interlayer. Solid-state bonding involves holding articles to be bonded in contact with a metal interlayer to form an assembly. The assembly is held at a temperature greater than about half the melting point of the interlayer, and subjected to a relatively high pressure, for example, greater than about ten Mega Pascals (10 MPa), for a prolonged period until the assembly is bonded. In solid-state bonding, the surfaces of the articles to be bonded should be meticulously clean. It is also desirable to make the surfaces very flat, preferably polished, to ensure the optimum contact with the bonding interlayer. Although a solid-state bond may be relatively strong, time required for surface preparation, the relatively high bonding pressure, and relatively high temperatures, may make the method unsuitable for mass production.

A disadvantage of high temperature methods for providing a ceramic-to-ceramic, metal-to-ceramic or metal-to-metal bond, particularly methods which require prolonged exposure of articles being bonded to a relatively high temperature, is that it may cause undesirable microstructural changes in the article during the bonding process.

A paper by Duvall et al., "TLP Bonding: a New Method for Joining Heat Resistant Alloys", *Welding Journal*, Vol 53, No 4, pp. 203–214, April 1974, discloses a method for bonding high-temperature metal alloy articles at a relatively low temperature. The method includes forming a bonding interlayer including an alloy. The bonding layer alloy includes an alloy similar to the alloy of the articles to be bonded, but also includes a relatively small percentage of material, for example, boron, for lowering the melting point of the bonding interlayer alloy. The low melting point alloy interlayer is placed between the articles to be bonded to form an assembly. The assembly is raised to a bonding temperature above the melting point of the interlayer and the entire interlayer melts to form a liquid. The liquid interlayer is said to comprise a transient liquid phase (TLP) of the alloy from which it is formed. The assembly is held at the bonding temperature and the melting point reducing material diffuses out of the TLP alloy into the adjoining articles. As the melting point reducing material diffuses out of the liquid the interlayer region solidifies to form a bond. After the bond has solidified it is preferably held at the bonding temperature for several hours to homogenize the interlayer in composition and structure. During the homogenizing process more of the melting point reducing material may diffuse from the interlayer alloy further increasing the melting point of the interlayer. As such, a bonded assembly may be used at a temperature higher than the original bonding temperature. The TLP bonding method of Duvall et al is advantageous in that the bonding interlayer actually melts at the onset of the bonding process. Melting the interlayer may enable it to fill an irregular space between articles being bonded. Melting the interlayer also eliminates the need to apply high pressure to the articles during bonding. As such, the method may be used without meticulous surface preparation, and may be used to bond irregularly shaped articles, i.e., for bonding non-flat surfaces.

While the method of Duvall et al. may be effective for bonding together metal alloy articles, it does not appear to be suitable for forming a bond to a ceramic article. This is because the method depends on diffusing a melting point lowering component out of an alloy interlayer and into an adjacent metal article. Accordingly, it is an object of the present invention to provide a TLP bonding method suitable for forming a metal to ceramic or a ceramic-to-ceramic bond.

It is another object of the invention to provide a metal-ceramic or a ceramic-ceramic bonded assembly which may be used at a higher temperature than the temperature at which it was bonded.

SUMMARY OF THE INVENTION

The present invention is directed to a method for bonding articles made from refractory materials, such as ceramics and refractory metals and alloys. Additionally, the method has potential applications to lower melting point materials such as aluminum. The method is directed to ceramic-ceramic and metal-ceramic bonds. However, it may also be used for metal-metal bonds.

In one embodiment, three metal layers are placed between two articles to be bonded. One of the layers includes a refractory metal. It is located between the other two of the three layers. These other two layers include a metal or alloy which melts or forms a liquid at a temperature below the temperature at which the refractory metal or alloy melts or begins to form a liquid. The lower melting point metal may be the same in each of the two layers.

The articles are pressed against the three layers to form an assembly. The assembly is heated to a first temperature not high enough to melt the refractory layer by itself, but high enough to melt or form a liquid from the low melting point layers, and thus form a liquid film between the layer including the refractory metal and the adjacent articles.

The assembly is maintained at the first temperature until the liquid is absorbed by or reacts with the refractory metal layer and a solid bonding layer is formed. The solid bonding layer has a higher melting point than the first temperature.

The bonded assembly may be held at the first temperature or at a second temperature, higher or lower than the first temperature, to homogenize the bonding layer. The homogenizing step may be executed immediately after the bonding step.

The first temperature may be chosen so that the refractory metal and a metal having a lower melting point may react to form an intermetallic compound. In an alternate embodiment, impurities incorporated in the refractory metal layer diffuse to the lower melting point metal layer and interact with this metal to produce a compound which has a melting point greater than that of the lower melting point metal.

The lower melting point layers may include between about one percent (1%) and twenty percent (20%) of a reactive metal such as titanium, to promote wetting of the articles to be bonded.

A lower melting point layer may be deposited on one or each of the articles, or on one or opposite sides of the layer including the refractory metal.

In another embodiment of the present invention, a layer including a refractory metal may be bonded onto a ceramic substrate. In this embodiment, a single low melting point layer may be placed between the layer to be bonded and the substrate to form an assembly. The assembly may then be heated to a first temperature as defined above to form a liquid, and maintained at this temperature until the liquid has disappeared, and a solid bond has formed between the layer including the refractory metal and the substrate.

Alumina articles have been bonded using a niobium (Nb) foil coated on each side with a layer of tin (Sn) including about four percent (4%) of titanium. The bonding of the alumina has been accomplished at as low as one-thousand degrees Centigrade (1000° C.). An interlayer so formed has been heated to 1500° C. without melting the bonding layer.

In another embodiment, ceramic articles have been bonded together by interlayers that react completely to form refractory intermetallics. The thickness of the refractory metal layer is comparable to that of the low melting point metal.

In yet another embodiment, a ceramic interlayer is placed between two ceramic articles to be bonded. Less refractory metals deposited between the ceramic interlayer and the ceramic articles chemically react with the ceramic interlayer to form a more refractory interlayer.

Still another embodiment of the present invention includes the use of a refractory-metal oxide layer positioned between layers of a lower melting point strong oxide forming metal, which serves as a transient liquid former.

Aluminum or aluminum alloy articles may be bonded together using a transient liquid phase method. Aluminum and metals having a melting point lower than aluminum are sandwiched between two aluminum articles.

DESCRIPTION OF THE DRAWING

The accompanying drawings, which are incorporated in and constitute a part of the specification, schematically illustrate, among other things, embodiments of the present invention and together with the general description given above and the detailed description of the embodiments given below serve to explain the principles of the invention.

DESCRIPTION OF THE PREFERRED EMBODIMENTS

Figure 1:
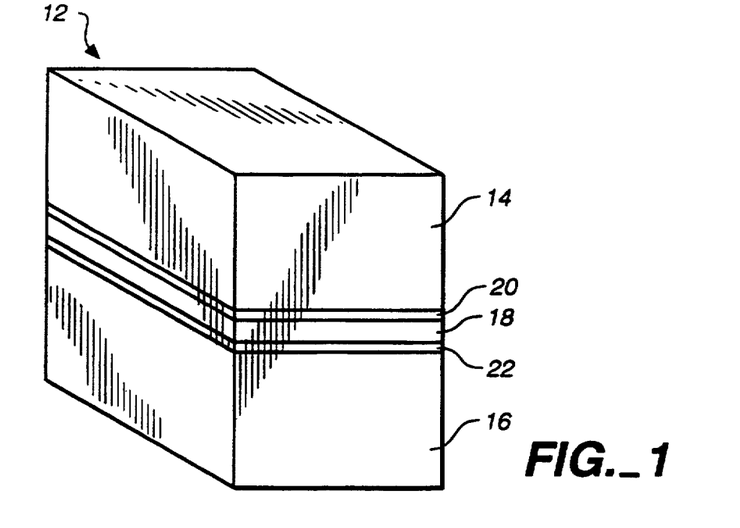
FIG. 1 schematically illustrates an assembly of two articles and three layers according to the present invention.

Referring now to the drawings wherein like components are designated by the same reference numerals, FIG. 1 shows an assembly 12 of a first article 14 and a second article 16, a first layer 18, a second layer 20, and a third layer 22. FIG. 1 depicts more than one embodiment of the present invention, and the particular components of each of the articles and layers will be described as each embodiment is discussed. Each of the layers may include a metal, an alloy, a ceramic material, and may also have sublayers consisting of combinations of these materials.

The articles are depicted as being regular in shape and having flat surfaces, however it will be understood that the method of the present invention may be applicable to articles of other shapes. The layers 18, 20 and 22 may, for example, be in the form a thin sheet or foil, or in the form of a film or layer deposited, for example, by sputtering, thermal evaporation or electrochemical process.

Figure 2:
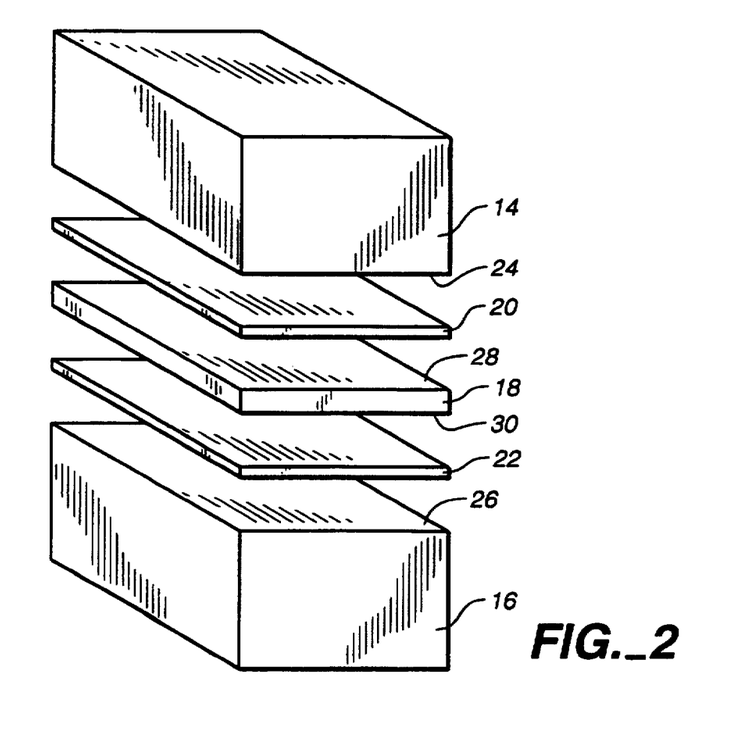
FIG. 2 schematically illustrates an exploded view of the assembly of FIG. 1 wherein the three layers are discrete layers.

Preferably, the articles include two mating surfaces 24 and 26 as illustrated in FIG. 2. Surfaces 24 and 26 are preferably polished. The minimum requirement for surface finish will depend to some extent on the thickness of the layer adjacent to the surface when the layer is melted or forms a liquid, as the liquid layer is preferably thick enough to fill irregularities in the surface. With sufficiently thick liquid layers, the surface may be prepared using standard brazing cleaning methods such as cleaning with a fine abrasive.

Figure 3:
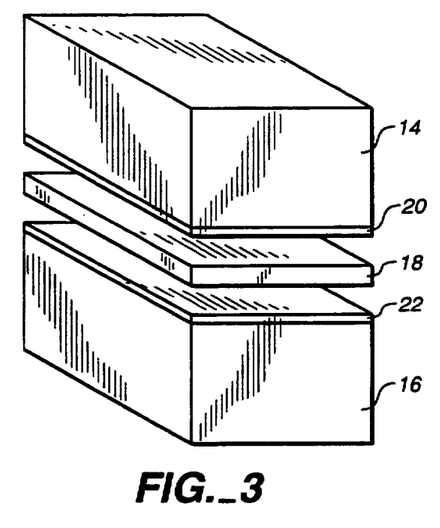
FIG. 3 schematically illustrates an exploded view of the assembly of FIG. 1 wherein a refractory metal layer has a layer deposited on each side.
Figure 4:
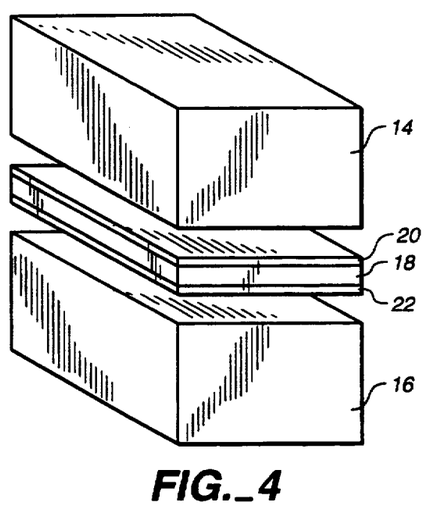
FIG. 4 schematically illustrates an exploded view of the assembly of FIG. 1 wherein each of the articles has a metal layer deposited on a surface thereof.

The layers 20, 22 and 24 may be discrete layers prior to bond formation, as illustrated in FIG. 2. Alternatively, as shown in FIG. 3, layer 20 may be deposited on surface 24 and layer 22 may be deposited on surface 26 prior to formation of a bond. Layers 20 and 22 may also be deposited on opposite surfaces 28 and 30 of layer 18 as shown in FIG. 4. Layers 20 and 22 may be deposited by well known methods including sputtering, thermal evaporation or electroplating.

Layer 18 is the layer which provides the majority component of a completed bonding layer. In a first embodiment of the present invention, layer 18 preferably includes a refractory metal, for example, niobium (Nb), nickel (Ni), tantalum (Ta), molybdenum (Mo), tungsten (W), or platinum (Pt). Layers 20 and 22 include a metal having a melting point lower than layer 18, for example gold (Au) and copper (Cu). It should be noted that the term metal layer is used generally, i.e., the metal layers may be elemental (a pure metal) or may be formed from an alloy. Layer 20 may include the same metal as layer 22. The metals of layers 20 and 22 may also include refractory metals or alloys, provided that they melt or begin to form a liquid below the temperature at which layer 18 melts or begins to form a liquid. As such, these metals may be whimsically termed less-refractory metals.

In this embodiment of the present invention, it is important that the metals of layers 20 and 22 form an alloy with the metal of layer 18, such that the alloy has a transient liquid phase (TLP). In another embodiment of the present invention, which is discussed in detail further below, it is preferred that at least one intermetallic compound of the metal of layer 18, and one or both of the metals of layers 20 and 22, be formed. Yet another embodiment, discussed below, includes a ceramic in layer 18 and metals in layers 20 and 22.

In practice, layer 18 is preferably the thicker of the three layers, as an object of the invention is to form a bonding layer including an alloy rich in the metal of layer 18. As such, the bonding layer may have a melting point as close as possible to the melting point of layer 18. Usually, layer 18 will be in the form of a metal foil preferably having a thickness of about twenty-five microns or greater. Layers 20 and 22 usually have a thickness less than about ten microns.

Generally, it is preferable that layers 20 and 22 be only sufficiently thick such that when they are in the form of a liquid, they may fill surface features of surfaces 24 and 26 and still form a continuous film over the surfaces. Generally, the thickness of layer 18 is selected such that it is at least thick enough, compared with the thickness of films 20 and 22, that an alloy formed from the metals of the films will include the desired majority percentage of the metal of layer 18. Theoretically, there is no upper limit to the thickness of layer 18. An upper limit may be determined by a desire to homogenize a bonding layer after it is formed, or to form a bonding layer entirely comprising an intermetallic compound. In such cases, the thickness of layer 18 is preferably as close as possible to the minimum thickness. If there is no compelling reason to homogenize a finished bonding layer, the thickness of layer 18 may be selected on the basis of considerations such as the availability of foils, or a desired thermal or mechanical property of the finished bond.

When a ceramic material is being bonded, it may be advantageous to include in films 20 and/or 22 (depending on which film is adjacent to a ceramic surface), a small percentage, i.e., between about 1% and 20% of a reactive metal such as titanium (Ti), zirconium (Zr), chromium (Cr), hafnium (Hf), lanthanum (La), tantalum (Ta), tungsten (W), vanadium (V) and thorium (Th). Inclusion of a reactive metal promotes wetting of the ceramic surface when layers 20 and 22 are melted. Wetting the ceramic surface is generally believed to promote the formation of a strong finished bond.

A bond is formed by heating assembly 12 to a first bonding temperature. This first temperature must be at least sufficiently high to cause melting of layers 20 and 22, which, for the purpose of the present description, will be assumed to include the same metal. An upper limit may be determined by one or more of a number of factors, including a sensitive temperature of an article, stress formed on cooling due to differential expansion, a eutectic point on a phase diagram of the alloy-forming metals, or, simply, as low a temperature as possible. If it is desired to form an intermetallic compound from the metals of the films, the selection of the bonding temperature will be determined by the temperature at which the desired intermetallic compound is known to form. In any event, the bonding temperature should not exceed the temperature at which the metal or alloy comprising layer 18 melts or begins to form a liquid when by itself. As will be shown in detail further in this disclosure, bonding experiments can usually be completed in about four hours. As such, within the above described general guidelines, a suitable bonding temperature for a particular metal layer system may be determined experimentally within a day or two. Clearly, however, a bonding temperature schedule for a complete manufacturing process for specific articles may be refined over a period of weeks or months.

Figure 5:
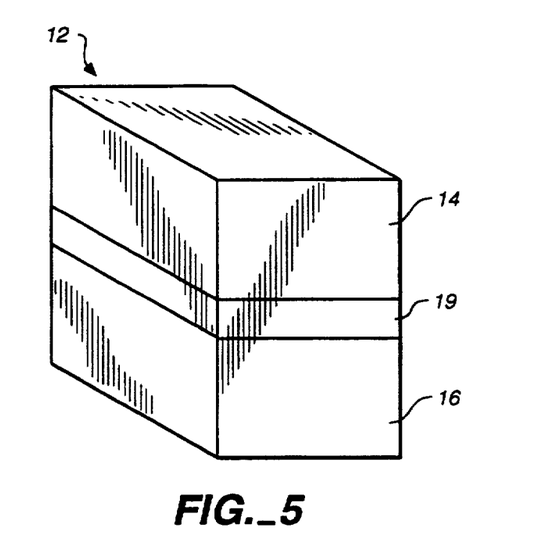
FIG. 5 schematically illustrates a bonded assembly including two articles and a bonding interlayer according to the present invention.

When an assembly is heated to a first temperature, the layers 20 and 22 begin to form a liquid and may melt completely. When the first temperature is reached, heating is adjusted so that the first temperature may be maintained. What happens thereafter is believed to be the following: Shortly after the formation of liquid, layer 18 begins to dissolve in adjacent liquid layers 20 and 22. An alloy forms which is initially liquid at the bonding temperature. Dissolution will continue until an equilibrium is reached between the composition of the liquid and the composition of the solid at the solid-liquid interface. These compositions may, for example, correspond to the appropriate liquidus and solidus compositions in the phase diagram of the alloy. Eventually the liquid essentially disappears. The disappearance of the liquid phase at the bonding temperature may occur by any of several mechanisms alone or in combination. It is generally expected that the low melting point component of the liquid will diffuse into solid layer 18 and thus be removed from the liquid. As the low melting point component is removed from the liquid, the thickness of the liquid layer is reduced to maintain a liquid having the liquidus composition. Ultimately the liquid entirely disappears. At this point, a solid bond comprising a single interlayer or bonding layer 19 (see FIG. 5) is formed between articles 14 and 16. The bonding layer 19 includes the materials which were previously in layers 18, 20, and 22. The specific composition of the bonding layer 19 thus depends upon the particular components in each of the layers, and will be described below in conjunction with the different embodiments of the present invention.

An alternative process may involve reaction of a metal in layers 20 and 22 with a ceramic article or articles. For some alloy systems, depletion of the metal as a result of this reaction may lead to an increase in the liquidus temperature for the alloy and thereby cause solidification at the bonding temperature. In another mechanism, the primary component of layers 20 and 22 may be consumed by a reaction with solid layer 18 which results in the formation of a compound which is solid at the bonding temperature. In all of the above described mechanisms, the bonding process may be described as an isothermal bonding process. The solid bonding layer 19 may have a composition gradient wherein the proportion of the minority component of the alloy of the layer is highest near the interfaces of bonding layer 19 and surfaces 24 and 26. The bonding layer 19, however, has a higher melting temperature than the temperature at which liquid formation first initiated during the heating of the original interlayer system.

After the bonding layer is formed, it may be desirable to homogenize the layer to more evenly distribute the minority component of the alloy. This may be accomplished by maintaining the bonded assembly at the original bonding temperature, or at some other temperature higher or lower than the bonding temperature. The time period necessary for homogenization will depend on the thickness of layer 18, the homogenizing temperature, and the rate of interdiffusion in the alloy. Homogenization may further increase the melting point of the bonding layer and may reduce mechanical stress in the bonded assembly.

It should be noted that, for practical thicknesses of layer 18, complete homogenization of the bonding layer may not be possible even if the homogenizing temperature is maintained for a period of days.

As mentioned above, it may be desirable to form a bonding layer 19 which is an intermetallic compound of a metal included in layers 20 and 22, and a metal included in layer 18. This may be accomplished by selecting as the bonding layer, metals which are known to form at least one intermetallic compound, preferably a stable and refractory intermetallic. The first temperature may be selected to provide an adequate rate of intermetallic formation. In principle, for example, nickel aluminides and titanium aluminides may be formed via multilayer interlayer systems and used for joining.

Formation of a nickel aluminide may occur when layer 18 is composed of nickel (Ni) and layers 20 and 22 are composed of aluminum such that the overall interlayer composition is NiAl. At temperatures between the melting point of aluminum and nickel, e.g. 800°–850° C., nickel aluminides will form. At equilibrium, NiAl will be present and is more refractory than any of the layers 18, 20, or 22 individually. The nickel aluminide (layer 19) remains solid at temperatures up to 1638° C. This method of bonding may be applied to either ceramic or metal articles.

Aluminum or aluminum alloys may be joined together using the method of the present invention in conjunction with particular metals. More specifically, aluminum or aluminum alloys may comprise articles 14 and 16, and layer 18 may also include aluminum or another metal having a melting point similar to that of aluminum. Layers 20 and 22 may include zinc (Zn), tin (Sn), silicon (Si), magnesium (Mg), lithium (Li), or germanium (Ge). These metals may melt at temperatures lower than the melting temperature of aluminum, or may alloy with aluminum to form liquids at temperatures lower than the melting temperature of aluminum, and the assembly thus has a transient liquid phase as described above. A bonding layer 19 is formed having a melting point above the bonding temperature and potentially above the melting temperature of the articles to be joined. Layers 20 and 22 may also include sublayers, described below, having combinations of these metals. Alternatively, a single core copper layer 18 may be sandwiched between two aluminum or aluminum alloy layers 20 and 22. This TLP assembly can be used in conjunction with aluminum alloy articles 14 and 16.

Ceramic articles may also be bound together by multiple interlayers. For example, articles 14 and 16 may be composed of the ceramic, silicon nitride ($Si_3N_4$). The silicon nitride may be coated by nickel layers 20 and 22. A nickel silicide is initially formed by heating the coated ceramic layers. Upon sandwiching aluminum between the silicide layers and applying heat, the silicide is converted to an aluminum nitride and silicon. The aluminum nitride has a melting point higher than the melting point of either the original nickel or aluminum layers. This process provides an alternate method of obtaining a bonding layer 19 which remains solid at temperatures well above those at which it was formed.

It may also be advantageous to include impurities in the refractory metal layer 18. Upon heating, the impurities may diffuse through the refractory metal layer 18 to react with the other metal layers 20 and 22 to form a bonding layer 19 having a melting temperature substantially higher than any of the individual layers. For example, nickel has a high tolerance for boron. When layer 18, containing nickel with interstitial boron, is brought into contact with layers 20 and 22 containing titanium, upon heating above the nickel-titanium eutectic temperature, the boron impurities quickly diffuse through the nickel layer and can react with the adjacent layers 20 or 22. A $TiB_2$ precipitate then forms in the titanium layers 20 or 22 to provide a bonding layer which has an elevated melting point relative to a bonding layer without boron. Carbon may be similarly used with other host metals to produce a carbide precipitate and iron.

Another embodiment of the present invention uses a refractory-metal oxide, such as iron oxide (FeO), for the layer 18. Layers 20 and 22 are composed of a strong oxide formed such as aluminum. When the layers are heated to the melting temperature of aluminum, oxygen in the FeO reacts with aluminum to form $Al_2O_3$. The resulting bonding layer 19 has a relatively high melting point, but was advantageously formed at a relatively low temperature. Other refractory-metal oxides may be combined with other oxide formers, or oxygen may be dissolved in the refractory metal, without departing from the scope of the present invention.

Figure 6:
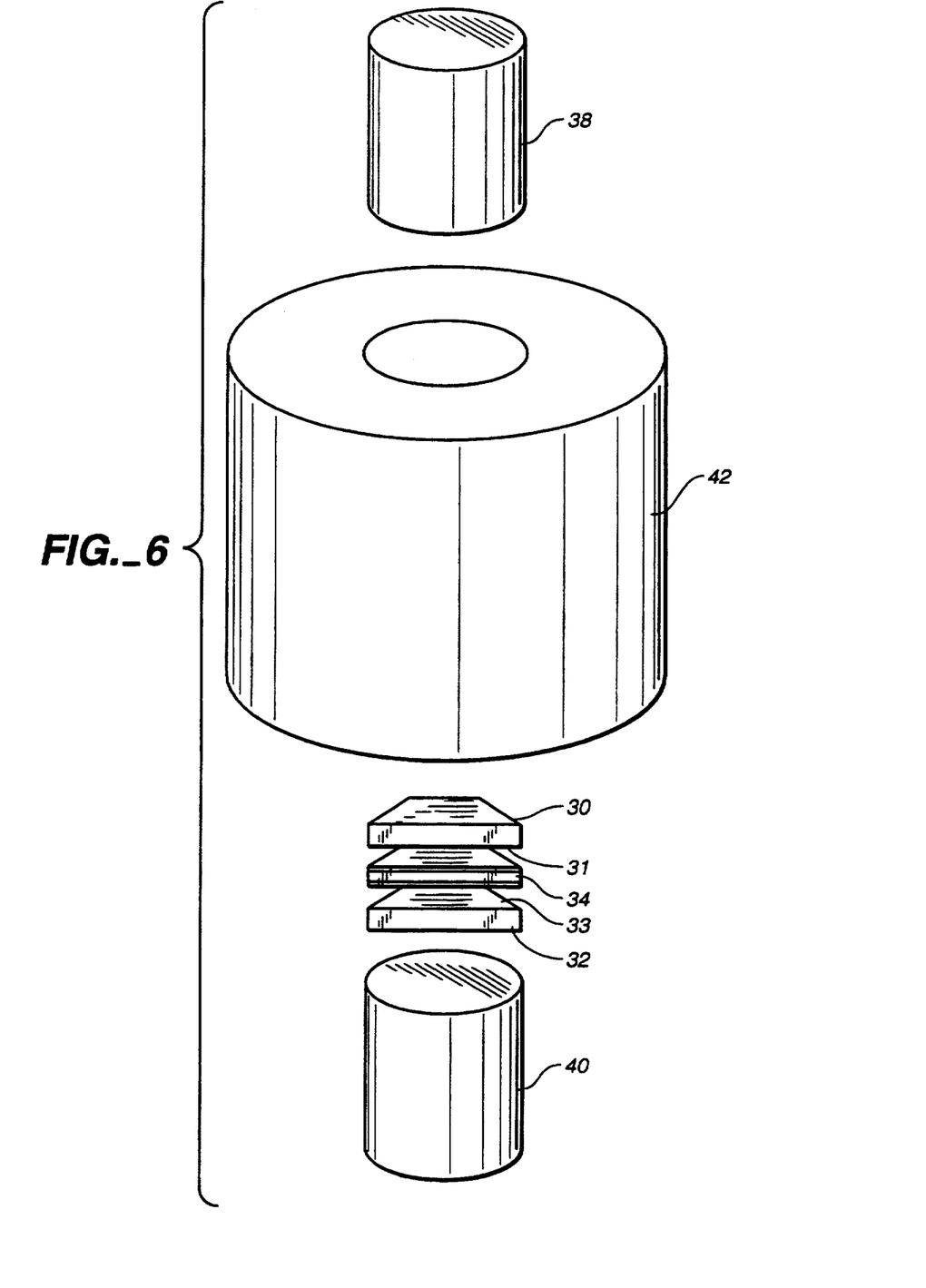
FIG. 6 schematically illustrates an experimental apparatus for bonding articles according to the present invention.

Referring now to FIG. 6, an experimental bonding method for bonding alumina articles is described. Alumina chips 30 and 32 about one-half inch square and one-eighth inch thick were selected. The surfaces 31 and 33 to be bonded were polished with one micron diamond paste. A tri-layer system 34 for forming a bonding layer was formed by sputtering onto opposite surfaces of niobium foil having a thickness of about one-hundred microns, a layer including about 96% Sn and 4% Ti. Tri-layer system 34 was cleaned, sequentially in isopropyl alcohol, acetone, and ethyl alcohol for a period of about ten minutes in each solvent. Alumina chips 30 and 32 were cleaned with acetone. Tri-layer 34 was then placed between chips 30 and 32 and pressed at a pressure of about 4 MPa between graphite rams 38 and 40 in a graphite die 42. Pressure was applied by a conventional hydraulic system. Several different thermal cycles have been used successfully. In one thermal cycle, for example, the assembly of die 42 and rams 38 and 40, containing chips 30 and 32 and multilayer 34, was heated at a reduced pressure of $10^{-7}$ atmospheres (atm) to a temperature of about 1000° C. The temperature was raised at a rate of about 5° C. per minute, maintained at about 1000 C. for about four hours, then cooled at about 8° C. per minute to room temperature. After bonding, four point bend specimens were prepared from the bonded assembly of chips 30 and 32. Selected specimens were annealed for eight hours at a temperature of 1500° C., i.e., at a temperature 500° C. higher than the temperature at which the bond was formed. The specimens remained intact indicating that a refractory interlayer had been formed during the bonding process. Generally it is possible that a bond may be annealed and remain intact at a temperature up to and approaching the liquidus temperature of a homogeneous alloy or an intermetallic formed from the interlayer component materials. As such, it may be possible to anneal a bonded assembly at a temperature as high as 1000° C. above the temperature at which the bonded assembly was formed. It is believed, for example, that an intermetallic $Nb_3Sn$ may be formed from a Sn-Nb-Sn tri-layer at a temperature of about 1000° C., yet will remain solid up to a temperature of about 2130° C.

Bonds according to the present invention have been produced at temperatures as low as about 650° C. Low temperature bonding is a useful feature of the present invention. Conventional diffusion bonding of alumina using niobium interlayers involve processing temperatures above 1400° C., usually between about 1600° C. and 1700° C.

While the above described experiment has been described in terms of bonding alumina using a niobium/tin system, the low temperature TLP or isothermal bonding method is not restricted to those ceramic materials. Other experiments have demonstrated the possibility of bonding alumina using Cu-Ni-Cu, Cu-Nb-Cu, Cu-Pt-Cu, and Au-Pt-Au tri-layer interlayers. For example, assemblies using copper as a liquid former have been bonded in a vacuum hot press with an applied load of 5.1 MPa at a temperature somewhat above the melting point of the coating layers, e.g., 1150° C. for copper. The processing temperature is typically several hundred degrees below that required for diffusion bonding with the foil metal. Heating and cooling rates to and from the bonding temperature are typically 4° C. per minute and 2° C. per minute, respectively, with a 2-6 hour hold at the bonding temperature. Variations from these rates will depend upon the particular ceramics, metals, or alloys in the layers between the articles. This general approach should be extendable to bonding nitrides and carbides. In addition the bonding process may also be possible using non-metallic interlayer materials provided those materials form at least a partial transient liquid phase.

A potential application for low temperature TLP bonding is in metallization of ceramic substrates, for example, for microelectronic applications. Refractory metal metallization is preferable in microelectronic applications using ceramic substrates because the refractory metal may have a relatively close expansion coefficient match to the ceramic. Such a component may be reliable under thermal cycling conditions common in electronic equipment.

Other applications may employ a ceramic interlayer to provide a close match between the coefficients of the bonding layer and the ceramics being bonded. For example, the ceramic articles 14 and 16 of FIG. 2 may be bonded together by using a ceramic compound in layer 18. A less refractory metal is used for layers 20 and 22. Ceramic articles 14 and 16 may be composed of silicon nitride, $Si_3N_4$, the ceramic layer 18 may be composed of mullite, $3Al_2O_3 \cdot 2SiO_2$, and layers 20 and 22 may be composed of aluminum. At temperatures above the melting point of aluminum, for example 800°-850° C., aluminum layers 20 and 22 interact with the mullite layer 18 to form aluminum oxide and a silicon-rich alloy. Such an interlayer provides a bonding layer having a relatively high melting point as compared to the lower temperature at which the bonding layer was formed.

Figure 7:
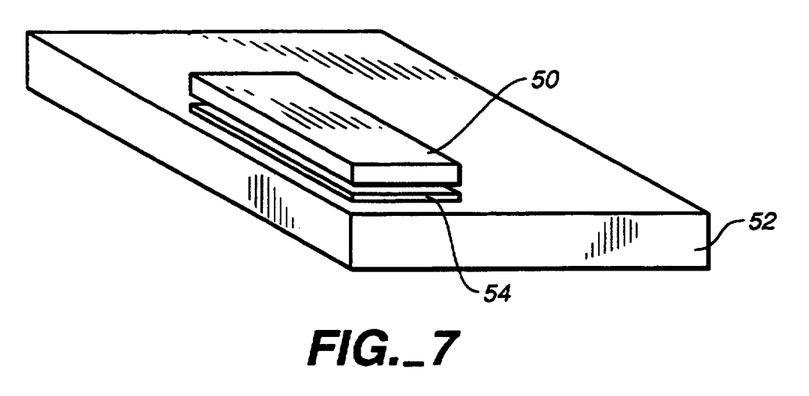
FIG. 7 schematically illustrates an arrangement according to the present invention including an interlayer for bonding a refractory metal layer on to a ceramic substrate.
Figure 8:
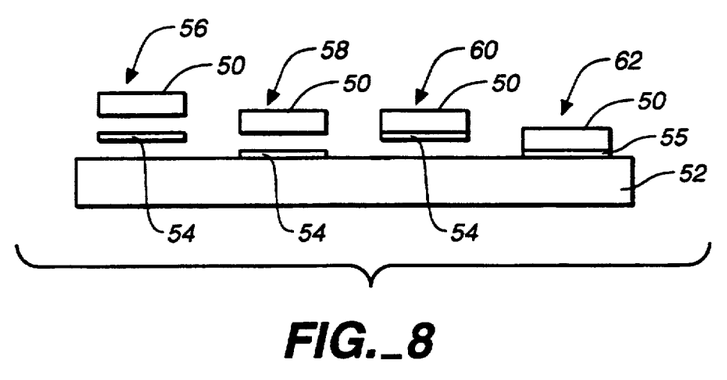
FIG. 8 schematically illustrates alternate arrangements of the interlayer of FIG. 7.

Turning now to FIG. 7, a TLP method for bonding a metal layer 50 to a substrate 52 is illustrated. Here, metal layer 50 may be a refractory metal, for example niobium (Nb), for forming an electrical connection on the substrate. Layer 50 may be bonded using a layer 54 of a transient liquid phase forming metal. Layer 50, in effect, has the same function as layer 18 in FIG. 1. Layer 54, in effect, has the function of one of the layers 20 and 22 of FIG. 1. A method for bonding the interlayer would be similar to the above-described method for bonding to articles wherein an assembly of substrate layer 50, substrate 52, and interlayer 54 is raised to a first temperature, sufficient to melt layer 54 and form a liquid therefrom, and held at the first temperature until the liquid disappears and a solid bonding layer is formed. For example, layer 50 may be a niobium (Nb) layer and layer 54 may be an copper (Cu) layer for forming a Nb-Cu alloy bonding layer at the interface of layer 54 and substrate 52. Referring now to FIG. 8, layers 50 and 54 may be discrete layers as shown by assembly 56. Alternatively, layer 54 may be deposited on substrate 52 (assembly 58) or on a surface of layer 50 (assembly 60).

In another embodiment, the metals of layers 50 and 54 and the first temperature may be chosen such that the metals react to form an intermetallic compound. For example, layer 50 may be a nickel (Ni) layer and layer 54 may be an aluminum layer. The first temperature may be maintained until the nickel and aluminum react together to form a solid NiAl or Ni$_3$Al intermetallic interlayer 55 (assembly 62) bonding layer 52 to substrate 50 (See FIG. 7). Other intermetallic bonding systems may include, for example, Ti-Al or Nb-Sn.

Alumina is an important ceramic material, and has been the most common ceramic used in joining studies. However, it is not a leading candidate for advanced engine/turbine applications. The extension of the method to Si$_3$N$_4$ joining provides evidence that it should be possible to apply the approach to the joining of other oxide (zirconia) and nonoxide (silicon carbide) ceramics, composites, and to other materials that are more suited for such applications. The possibility of inhibiting deleterious reactions by reducing processing temperature requirements and by judicious design of the interlayers may prove particularly useful for joining reactive nonoxide ceramics such as SiC and Si$_3$N$_4$.

Figure 9:
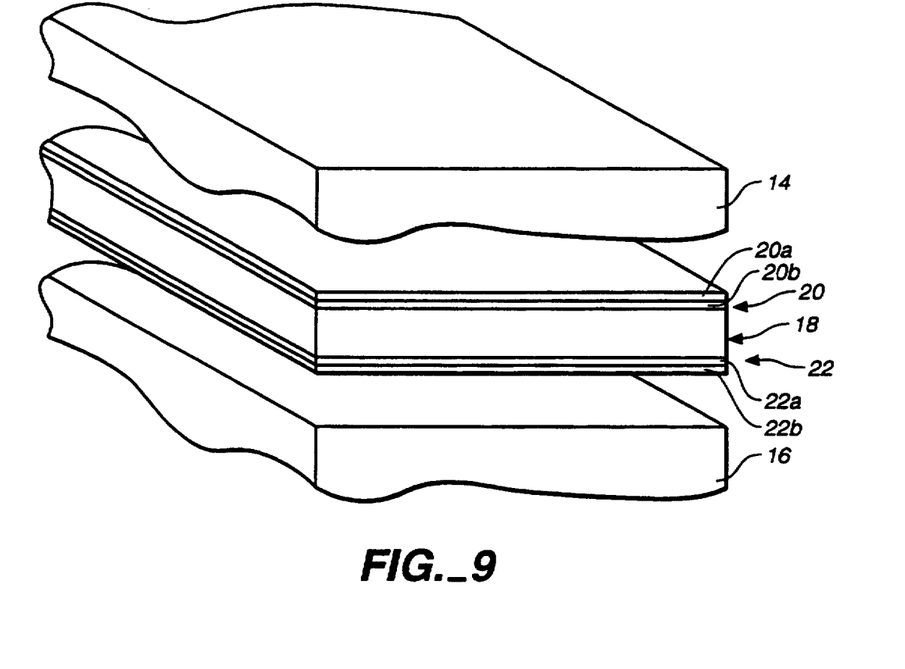
FIG. 9 schematically illustrates the assembly of FIG. 3 wherein two metal layers include sublayers for forming an alloy.
Figure 10:
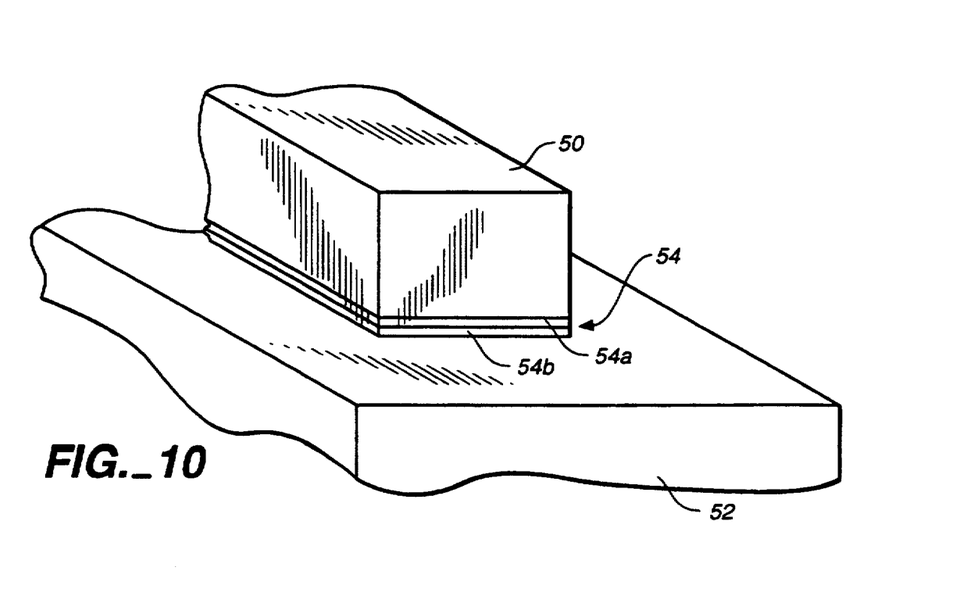
FIG. 10 schematically illustrates an assembly of FIG. 7 wherein an interlayer includes two sublayers for forming an alloy.

In yet another embodiment of the present invention, layers 20 or 22 (See FIG. 1) or layer 54 (See FIG. 7) may be formed from two or more sublayers 20a and 20b, and 22a and 22b (See FIG. 9) and 54a and 54b (See FIG. 10). This embodiment may be useful when it is desired that any of layers 20, 22 or 54 is an alloy. The materials and thicknesses of the sublayers may be selected such that an alloy of a desired composition is formed when the sublayers melt or form a liquid. The thickness of the sublayers may be selected such that an alloy is formed which is homogeneous or may have a predetermined composition gradient in the direction of layer thickness. A composition gradient may be useful, for example, for matching expansion coefficients of the articles and the bonding interlayer. Although, for clarity, only two sublayers are shown in each of layers 20, 22, and 54, it will be evident that more than two sublayers may be used. This may be useful, for example, in forming an alloy layer having a homogeneous composition. Sublayers may be practically formed by sequential deposition of alloy components by any of the well known thin film deposition methods such as sputtering or thermal evaporation.

Figure 11:
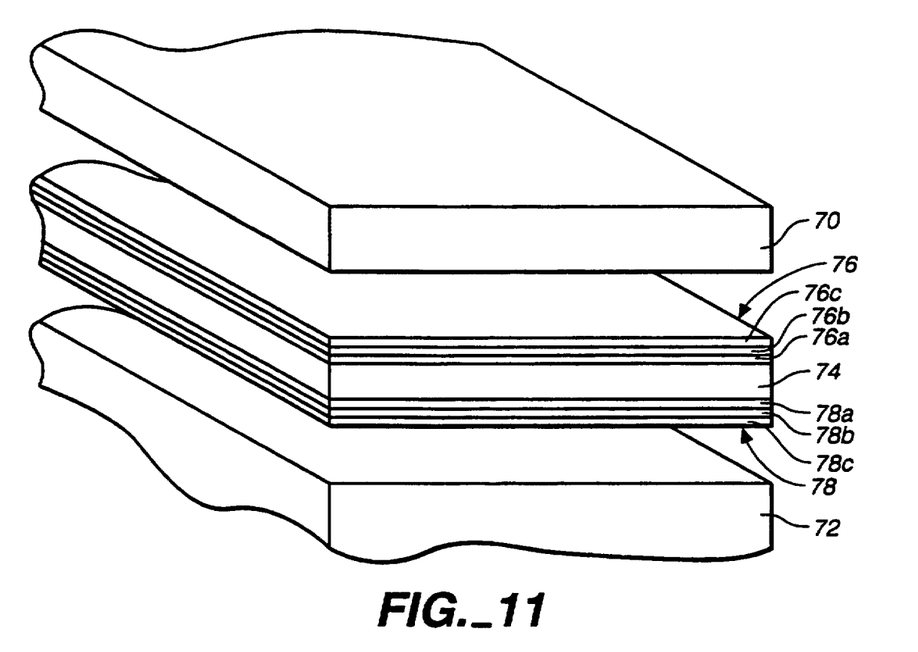
FIG. 11 schematically illustrates an embodiment of the present invention wherein two low melting point metal layers each include three sublayers and are deposited on a refractory metal interlayer.

In yet another embodiment of the present invention, illustrated in FIG. 11, ceramic layers 70 and 72 are bonded together by an assembly which includes layers 74, 76, and 78. The ceramic layers 70 and 72 may be composed of a ceramic such as Si$_3$N$_4$. Layer 74 is composed of a refractory metal such as nickel, which is provided in a 25 μm thick foil, and layers 76 and 78 are designed to provide a transient liquid phase (TLP) during the bonding process. Layers 76 and 78 each include three sublayers in this embodiment: layer 76 includes sublayers 76a, 76b, and 76c, and layer 78 includes sublayers 78a, 78b, and 78c. As shown in FIG. 11, layers 76 and 78 are deposited on the refractory metal layer 74 before the entire assembly is pressed together and heated.

Sublayers 76a and 78a are composed of copper and sublayers 76b and 78b are composed of titanium. The titanium promotes wetting of the Si$_3$N$_4$ surface by the transient liquid phase during bonding. Sublayers 76c and 78c are composed of gold. The gold prevents oxidation of both the copper and titanium sublayers prior to the pressing step during the bonding process. Alternatively, sublayers 76a and 78a may be composed of titanium, and sublayers 76b and 78b may be composed of copper. Titanium may be sputtered onto the ceramic articles 70 and 72, and copper may be deposited by evaporation. Again, gold sublayers 76c and 78c are is deposited on the sublayers 76b and 78b to prevent oxidation of the copper. A range of overall titanium concentrations, dependent in part on the thicknesses of the constituent layers, can produce strong bonds. Regardless of the ordering of the sublayers, good results were obtained with a gold to copper to titanium ratio of 48:48:4. A strong bonding joint was produced by heating the assembly to a temperature of 950° C. for approximately two hours. Unbonded Si$_3$N$_4$ had an average flexure strength of approximately 10$^6$ Pa. The average bend strengths of bonded assemblies was 770 ($\pm$200)$\times$10$^3$ Pa.

Figure 12:
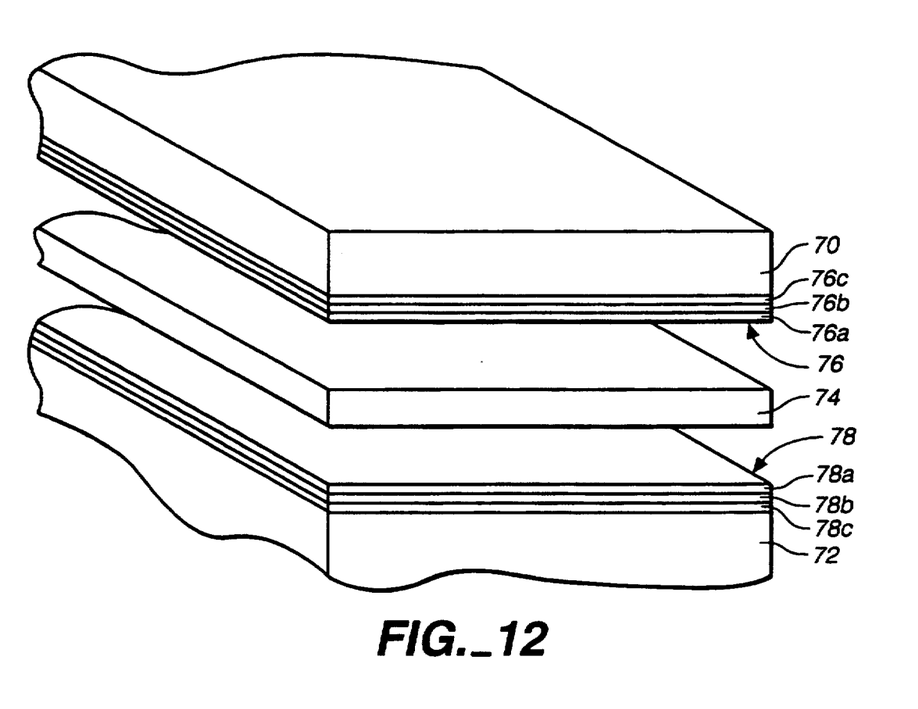
FIG. 12 schematically illustrates an alternative assembly of FIG. 11 wherein the sublayers are deposited on the ceramic substrates prior to formation of a bond.

As illustrated in FIG. 12, layers 76 and 78 may be deposited on the ceramic substrates 70 and 72 prior to pressing the assembly together. This method avoids the need to turn over the refractory metal layer 74 during processing in order to deposit the layers 76 and 78 on the refractory metal layer 74. The outer sublayers 76a and 78a are again composed of gold to prevent oxidation of other sublayers 76b, 78b, 76c and 78c. Titanium comprises sublayers 76c and 78c in order to facilitate wetting of the Si$_3$N$_4$ layers 70 and 72. The arrangement of the titanium and copper sublayers may also be switched such that sublayers 76c and 78c are composed of copper, and sublayers 76b and 78b are composed of titanium.

Alternatively, layers 76 and 78 can have different sublayers compositions without departing from the scope of the present invention. Alternative compositions for the sublayers include gold-silicon-titanium (Au-Si-Ti) and silver-copper-titanium (Ag-Cu-Ti). As noted above, the titanium promotes wetting. Other reactive metals, such as chromium or zirconium, may also be employed to promote wetting of the ceramic substrate. Tungsten and other metals, such as molybdenum, niobium, tantalum, rhenium, osmium, iridium, and rhodium, may also be used to metallize, i.e. put a metal coating on, the bonding surface of the silicon nitride. These metals essentially form a barrier between, for example, the ceramic article 72 and sublayers 78b and 78a. A metal-to-metal bond thus forms between the metallization layer (e.g. tungsten) and the adjacent sublayers.

The combination of gold, copper, and titanium in the transient liquid phase layer provides a low processing temperature with the capability to produce joints that are capable of subsequent use at elevated temperatures. The combination of the three layers 74, 76, and 78 provides a bonding layer which is more refractory than any of the layers individually.

In summary, a low temperature isothermal bonding method for joining ceramic and other refractory materials has been described. The method provides for joining the materials at temperatures and pressures significantly less than are usual in prior art bonding methods. As such, bonding apparatus may be simpler, and the method may be applied to joining articles having complex shapes. The method may also be applied to the manufacture of electronic components, for example, for bonding a refractory metal layer onto a ceramic substrate.

The present invention has been described in terms of a preferred embodiment and a number of other embodiments, and further in terms of specific materials. The invention, however, is not limited to the embodiments and materials described and depicted. Rather, the scope of the invention is defined by the appended claims.

What is claimed is:

1. A method for bonding refractory materials, comprising:
   (a) providing first and second articles, said first article including $Si_3N_4$;
   (b) placing at least three metal layers between said first and second articles, said first metal layer being located between said second and third metal layers, said first metal layer including a refractory metal, and said second and third metal layers each having a melting point which is lower than said refractory metal;
   (c) pressing said first, second, and third metal layers between said first and second articles to form an assembly;
   (d) heating said assembly to a first temperature sufficient to form a liquid from said second and third metal layers, but said first temperature being not sufficient to melt said first metal layer by itself; and
   (e) maintaining said assembly at said first temperature until said liquid disappears and a solid bonding layer is formed between said first and second articles, said bonding layer having a higher melting point than said first temperature.

2. The method of claim 1 wherein said second article includes $Si_3N_4$.

3. The method of claim 1 further including:
   (f) heating said assembly at a second temperature until said bonding layer is homogenized.

4. The method of claim 3 wherein step (f) is performed immediately after step (e).

5. The method of claim 1 wherein at least one of said second and third metal layers includes at least two sublayers for forming an alloy.

6. The method of claim 1 wherein said second metal layer is comprised of a first sublayer having a first amount of gold, a second sublayer having a second amount of silicon, and a third sublayer having a third amount of titanium.

7. The method of claim 5 wherein said second metal layer is comprised of a first sublayer having a first amount of copper, a second sublayer having a second amount of silver, and a third sublayer having a third amount of titanium.

8. The method of claim 5 wherein said second metal layer is comprised of a first sublayer having a first amount of gold, a second sublayer having a second amount of copper, and a third sublayer having a third amount of titanium.

9. The method of claim 8 wherein said amount of gold in said first sublayer is approximately equivalent to said amount of copper in said second sublayer.

10. The method of claim 8 wherein said first, second, and third amounts are in ratios of approximately 48:48:4.

11. The method of claim 5 wherein a first of said three sublayers is deposited on said first article, said first sublayer being comprised of a metal which is reactive with $Si_3N_4$ and which promotes wetting.

12. The method of claim 11 wherein said metal is selected from the group consisting of titanium, zirconium or chromium.

13. The method of claim 5 wherein a first of said three sublayers is deposited on said first article, said first sublayer being comprised of a metal which metallizes said first article.

14. The method of claim 13 wherein said metal is selected from the group consisting of tungsten, molybdenum, niobium, tantalum, rhenium, osmium, iridium, and rhodium.

15. The method of claim 5 wherein said second and third metal layers are deposited on said first metal layer prior to said step (c).

16. The method of claim 5 wherein said second metal layer is deposited on said first article prior to said step (c).

17. The method of claim 15 wherein said first sublayer of said second and third metal layers includes an amount of gold, said first sublayer being deposited furthest from said first metal layer relative to said second and third sublayers.

18. The method of claim 16 wherein said first sublayer of said second metal layer includes an amount of gold, said first sublayer being deposited furthest from said first article relative to said second and third sublayers.

19. The method of claim 16 wherein said first metal layer includes nickel.

20. The method of claim 1 wherein said three metal layers are composed of metals which, upon heating, react to form a bonding layer being more refractory than any of said three metal layers individually.

21. The method of claim 20 wherein said first metal layer includes nickel, and said second and third metal layers include aluminum.

22. A method for bonding refractory materials, comprising:
   (a) providing first and second articles;
   (b) placing at least three layers between said first and second articles, a first of said three layers being composed of a ceramic material;
   (c) pressing said first, second, and third layers between said first and second articles to form an assembly;
   (d) heating said assembly to a first temperature sufficient to melt said second and third layers; and
   (e) maintaining said assembly at said first temperature until a solid bonding layer is formed between said first and second articles, said bonding layer having a higher melting point than said first temperature.

23. The method of claim 22 wherein said second and third layers are composed of a metal, said first layer being positioned between said second and third layers.

24. The method of claim 23 wherein said ceramic is composed of $3Al_2O_3.2SiO_2$, said second layer is composed of aluminum, and said third layer is composed of aluminum.

25. A method for bonding refractory materials, comprising:
   (a) providing first and second articles;

(b) placing at least three metal layers between said first and second articles, said first metal layer being located between said second and third metal layers, said first metal layer including a refractory metal and impurities, said impurities reacting with said second metal Layer to form a compound having a melting temperature greater than said second metal layer;

(c) pressing said first, second, and third metal layers between said first and second articles to form an assembly;

(d) heating said assembly to a first temperature sufficient to form a liquid from said second and third metal layers, but said first temperature being not sufficient to melt said first metal layer; and (e) maintaining said assembly at said first temperature until said liquid disappears and a solid bonding layer is formed between said first and second articles, said bonding layer having a higher melting point than said first temperature.

26. The method of claim 25 wherein said impurities are chosen from the group consisting of boron and carbon.

27. The method of claim 26 wherein said refractory metal includes nickel.

28. The method of claim 25 wherein said impurities react with said third metal layer to form a compound having a melting temperature greater than said third metal layer.

29. A method for bonding refractory materials, comprising:

(a) providing first and second articles;

(b) placing at least three layers between said first and second articles, said first layer being located between said second and third layers, said first layer including a refractory-metal oxide, said second and third layers including a metal being a strong oxide former to promote wetting, and said second and third layers having a melting point less than the melting point of said first layer;

(c) pressing said first, second, and third layers between said first and second articles to form an assembly;

(d) heating said assembly to a first temperature sufficient to form a liquid from said second and third layers, but said first temperature being not sufficient to melt said first layer; and (e) maintaining said assembly at said first temperature until said liquid disappears and a solid bonding layer is formed between said first and second articles, said bonding layer having a higher melting point than said first temperature.

30. The method of claim 29 wherein said first layer includes iron oxide.

31. The method of claim 29 wherein said second and third metal layers are chosen from the group including aluminum and magnesium.

* * * * *